April 20, 1965  R. J. MELTZER  3,179,898
ELLIPTICAL LAMINAR REFLECTING CAVITY FOR MASER EXCITATION
Filed April 2, 1962

INVENTOR.
ROBERT J. MELTZER
BY
ATTORNEYS

United States Patent Office 3,179,898
Patented Apr. 20, 1965

3,179,898
ELLIPTICAL LAMINAR REFLECTING CAVITY
FOR MASER EXCITATION
Robert J. Meltzer, Irondequoit, N.Y., assignor to Bausch
& Lomb Incorporated, Rochester, N.Y., a corporation
of New York
Filed Apr. 2, 1962, Ser. No. 184,133
5 Claims. (Cl. 331—94.5)

This invention relates to a reflecting system for exciting an optical maser and more particularly to an elliptical laminar reflector for transferring radiant energy to the ruby crystal.

The optical maser is a device wherein radiant energy is stored. A radiant flux provides the excitation for the maser. The energy is retained within the crystal until a controlling radiation releases the stored energy in a form of intense radiation. It is necessary for the operation of the maser that a source of radiation be provided with means for directing the radiation on the crystal to build up the energy within the ruby crystal. Accordingly, this device is intended to provide such an excitation for an optical maser.

It is an object of this invention to provide maximum energy transfer from a radiation source to the crystal element forming the optical maser.

It is a further object of this invention to provide an elliptical reflecting means defining the peripheral edges of laminar flux transmitting means to reflect radiation from a radiant source to the ruby crystal of an optical maser.

The objects of this invention are accomplished by placing a plurality of laminae in laminar relationship with optical insulating means intermediate each of the laminae. The peripheral edges of each of the plurality of laminae define an ellipse having two focal points. An exciting lamp is positioned at the first focal point and radiates energy which is directed by the elliptical reflector to the second focal point at which is located the ruby crystal forming the optical maser. The elliptical reflector provides maximum energy transfer from the first focal point to the second focal point.

Further objects and advantages of the invention will be apparent from the following detailed description of the device forming a specific embodiment thereof and illustrated in the appended drawings, in which.

Figure 1:
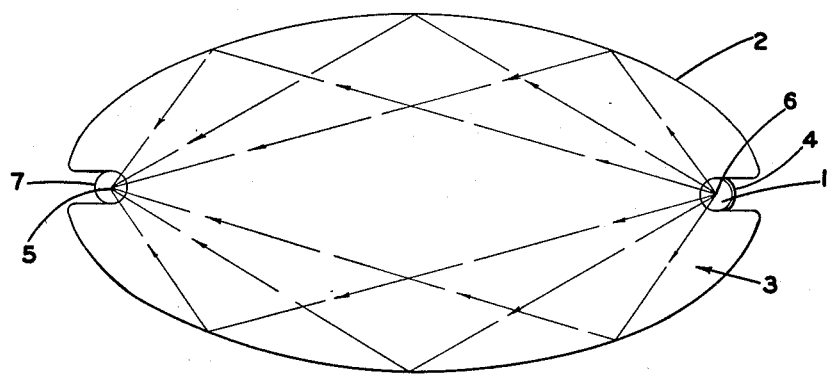
FIG. 1 is a schematic illustration of the transmission of energy from the radiating source to the ruby crystal.

Referring to the drawings, FIG. 1 illustrates the reflector 2 which is formed by deposition of a reflecting coat on the outer periphery of the laminae 3. The peripheral surface of each of the laminae defines an ellipse having two focal points. An exciting lamp 1 which is positioned at the first focal point 6 of the elliptical reflector 2 formed on the elliptical laminae 3. The lamp is generally cylindrical in shape and radiates radially to the longitudinal axis of the lamp. A reflector 4 may be positioned on the external side of the exciting lamp 1 to reflect radiant energy back into the system which in turn is reflected by the elliptical reflector 2 to the second focal point 5. The second focal point 5 is the center of the ruby crystal 7. An elliptical reflector has the property that a source of illumination positioned at the first focal point radiate light which is reflected by an elliptical reflector to focus at the second focal point. In this manner the radiant energy coming from the lamp 1 is incident on the reflecting elliptical surface and reflected to the second focal point 5 in the ruby crystal 7.

The laminae 3 are preferably constructed of a glass having a high refractive index. The high refractive index combined with the silvered or aluminized external surface confine the radiant energy within the system and provide maximum transfer of energy from the lamp 1 to the ruby crystal 7.

Figure 2:
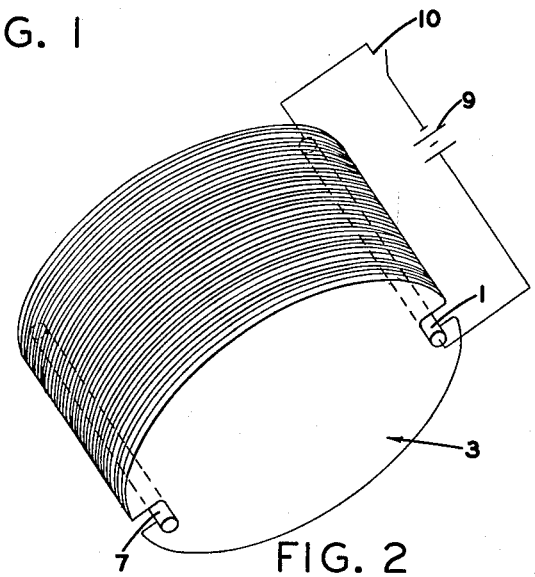
FIG. 2 is an assembly view of the device.

Referring to FIG. 2 an assembly of the laminar reflecting system is illustrated. A plurality of laminae 3 are positioned in laminar relation with the exciting lamp 1 positioned at the first focal point and the ruby crystal 7 positioned at the second focal point. The lamp 1 may be connected to any suitable source of electrical energy 9 through a control means 10.

Figure 3:
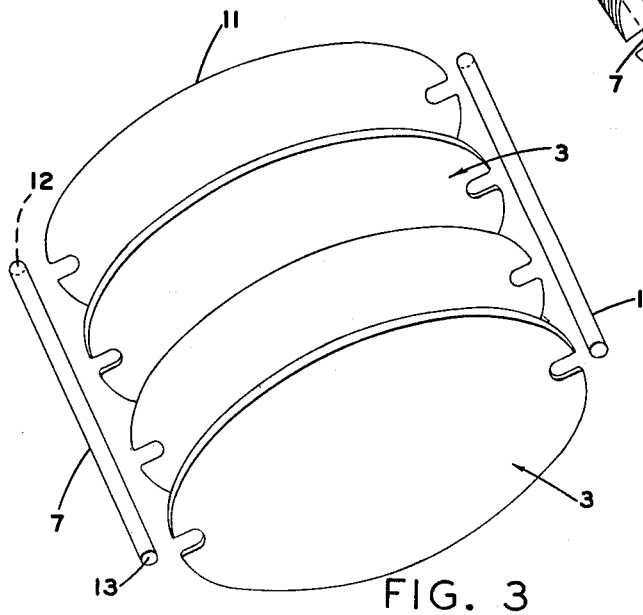
FIG. 3 is an exploded view of the main elements of the excitation system.

Each of the laminae 3 are optically insulated from each other by an insulating means 11 intermediate each of the laminae. This is more clearly shown in the exploded view of FIG. 3. The exciting lamp 1 is positioned along the ends of the plurality of laminae 3. The ruby crystal 7 is positioned on the opposite end of the laminae. The optical insulation 11 which is disposed between each of the plurality of laminae is shown intermediate each of the laminae 3. The insulation 11 may be a metallic reflector of any suitable insulating material positioned between adjacent laminae. With the use of a glass having a high refractive index, it is possible that the presence of air intermediate each of the laminae might be sufficient to optically insulate each of the laminae from each other in view of the high refractive index of the glass.

The reflector system as described above operates in the following manner. As the excitation lamp 1 is energized the light is radiated into the optical system. The radiating light is reflected by the elliptical reflector 2 defining the peripheral boundary of each laminae. The excitation lamp 1 is located at the first focal point of the ellipse defined by the reflecting peripheral surface of each of the laminae. The radiant energy is reflected toward the second focal point of the ellipse defined by the reflecting surface of each of the laminae, at which is located the ruby crystal. In this manner, the energy from the excitation lamp is transferred to the ruby crystal. The energy level is built up in the ruby crystal and may be released by suitable means which causes a burst of collimated light emerging from the end of the ruby crystal 7. The ruby crystal 7 is silvered on the end 12 to opacity and the end 13 has a semi-transparent silver film. As the ruby crystal is fired the light is directed out the end 13 in a collimated manner with a beam of light having high intensity.

While the invention is thus described it is not wished to be limited in the precise details as described as changes may be readily made wtihout departing from the spirit of the invention.

What is claimed is:

1. A laminar optical system comprising, a plurality of elliptical laminae positioned in laminar relationship to each other, a reflective coating on the elliptical edge surfaces of each of said laminae, optical insulating means intermediate each of said laminae, a radiating source positioned at the first local point of each of said elliptical laminae, a maser element positioned at the second focal point of each of said laminae, said reflective coatings thereby reflecting radiant energy from said radiating source to said maser element to provide maximum energy transfer in said optical system.

2. A radiation system comprising a plurality of elliptical laminae positioned in laminar relation to each other, a reflective surface on the peripheral boundary of each of said elliptical laminae, a metallic disc disposed between each of said laminae forming an optical insulation between each of said laminae, a radiating element positioned at the first focal point of each said elliptical reflective surface, a ruby crystal positioned at the second focal point of each said elliptical reflective surface, said elliptical reflective surface reflecting radiant energy from said radiating element to said ruby crystal thereby providing maximum energy transfer to said crystal.

3. A laminar optical system comprising a plurality of laminae arranged in laminar relationship to each other, means intermediate each of said laminae optically insulating each of said laminae from each other and providing a number of parallel light transmitting paths equal to the number of laminae, two elliptical concave reflecting surfaces on each laminae defining at least a portion of an ellipse, each of said concave reflecting surfaces having the same conjugate foci, a radiating source located at the first of said foci, a maser element located at the second of said foci, said reflecting surfaces reflecting radiant energy incident thereon to said second foci and thereby transferring the maximum of radiant energy through said system.

4. A laminar optical system comprising a plurality of laminae arranged in laminar relation relative to each other, insulating means adjoining each of said laminae laterally and optically insulating said elements for parrarallel light transmission through said laminae, at least a portion of an elliptical reflecting edge surface defined by each of said laminae, a radiating element positioned at the first local point of said elliptical surface for radiating radiant energy, an optical maser element positioned at the second focal point of said elliptical surface, said elliptical reflecting edge surface receiving incident light from said radiating element and reflecting said light to the second focal point of said elliptical surface to provide maximum transfer of energy through said optical system.

5. A laminar optical system comprising a plurality of high index light transmitting laminae disposed in laminar relation relative to each other, optically insulating means of low index relative to said laminae intermediate each of said laminae optically insulating each of said laminae from each other and providing parallel light paths through each of said laminae, at least a portion of an elliptically reflecting edge surface and defining a reflecting boundary of each of said laminae, two focal points defined by said surface, a source of radiation positioned at the first focal point, and optical maser element positioned at the second focal point, said reflecting surface receiving incident light from said radiating source and reflecting said light to said optical maser element thereby providing maximum energy transfer in said optical system.

References Cited by the Examiner
UNITED STATES PATENTS
3,060,806   10/62   Lewis et al. _____ 88—1 X

OTHER REFERENCES

Ciftan et al.: "A Ruby Laser with an Elliptic Configuration," Proceedings of the IRE, vol. 49, No. 5, May 1961, pages 960 and 961.

JEWELL H. PEDERSEN, *Primary Examiner.*

UNITED STATES PATENT OFFICE
CERTIFICATE OF CORRECTION

Patent No. 3,179,898                          April 20, 1965

Robert J. Meltzer

It is hereby certified that error appears in the above numbered patent requiring correction and that the said Letters Patent should read as corrected below.

Column 2, line 57, for "local" read -- focal --; column 3, line 25, for "local" read -- focal --; column 4, line 14, for "and" read -- an --.

Signed and sealed this 21st day of September 1965.

(SEAL)
Attest:

ERNEST W. SWIDER                              EDWARD J. BRENNER
Attesting Officer                                 Commissioner of Patents